United States Patent [19]

D'Alayer de Costemore d'Arc

[11] Patent Number: 5,082,023
[45] Date of Patent: Jan. 21, 1992

[54] SINGLE-HANDLE FAUCET

[75] Inventor: Stephane M. D'Alayer de Costemore d'Arc, Brussels, Belgium

[73] Assignee: Staar S. A., Belgium

[21] Appl. No.: 547,203

[22] Filed: Jul. 3, 1990

[30] Foreign Application Priority Data

Oct. 31, 1989 [BE] Belgium ............... 8901157

[51] Int. Cl.$^5$ ............... F16K 11/00; F16K 31/44
[52] U.S. Cl. ............... 137/636.3; 137/625.17; 137/625.4; 137/636.4; 251/285; 251/288
[58] Field of Search ............... 137/604, 605, 606, 607, 137/636.3, 636.4, 801, 897, 898, 625.17, 625.4; 251/95, 96, 98, 99, 100, 104, 105, 106, 110, 208, 285, 288

[56] References Cited

U.S. PATENT DOCUMENTS

| 1,406,030 | 2/1922 | Kelly. | |
| 1,704,851 | 3/1929 | Zolleis. | |
| 2,171,992 | 9/1939 | Rantine | 137/607 |
| 2,655,167 | 10/1953 | Dunkelow | 137/ |
| 2,800,798 | 7/1957 | Korsmo | 74/ |
| 2,878,489 | 3/1959 | Graham | 4/ |
| 2,980,130 | 4/1961 | Horke | 137/636.4 |
| 3,080,570 | 3/1963 | Weddendorf | 4/ |
| 3,190,309 | 6/1965 | Staat et al. | 137/636.4 |
| 3,417,783 | 12/1968 | Manoogian | 137/ |
| 3,421,540 | 1/1969 | Fulton et al. | 137/636.4 |
| 3,422,849 | 1/1969 | Manoogian | 137/ |
| 3,512,547 | 5/1970 | Gibbs et al. | 137/ |
| 3,761,967 | 10/1973 | Owings | 4/ |
| 3,891,005 | 6/1975 | Manoogian et al. | 137/636.3 |
| 4,015,632 | 4/1977 | Frahm et al. | 137/ |
| 4,051,869 | 10/1977 | Holt et al. | 137/607 |
| 4,093,178 | 6/1978 | Hughes et al. | 251/110 |
| 4,103,709 | 8/1978 | Fischer | 137/ |
| 4,207,916 | 6/1980 | Hayes | 137/ |
| 4,357,957 | 11/1982 | Bisonaya et al. | 137/ |
| 4,457,342 | 7/1984 | Moen | 137/ |
| 4,478,249 | 10/1984 | Fleischmann | 137/636.4 |
| 4,538,646 | 9/1985 | Yang | 137/ |
| 4,606,370 | 8/1986 | Geipel et al. | 137/ |
| 4,610,272 | 9/1986 | Gottwald et al. | 137/636.3 |
| 4,662,399 | 5/1987 | Buchner et al. | 137/ |
| 4,708,172 | 11/1987 | Riis | 137/ |
| 4,718,128 | 1/1988 | Fan | 4/ |
| 4,723,574 | 2/1988 | Bergmenn et al. | 137/ |
| 4,733,688 | 3/1988 | Lorch | 137/ |
| 4,770,208 | 9/1988 | Stella | 137/ |

FOREIGN PATENT DOCUMENTS

| 294051 | 10/1965 | Australia | 137/636.3 |
| 3510833 | 3/1985 | Fed. Rep. of Germany | 4/ |
| 3537474 | 10/1985 | Fed. Rep. of Germany | 4/ |
| 189170 | 10/1989 | Fed. Rep. of Germany | 4/ |

Primary Examiner—George L. Walton
Attorney, Agent, or Firm—Leydig, Voit & Mayer

[57] ABSTRACT

A single-handle faucet has a valve, a connecting rod and a handle on the connecting rod which can be pivoted between an OFF position and a full ON position. The handle is movably mounted on the connecting rod. When the handle is moved to a first position, the handle is prevented from pivoting past an intermediate position between the OFF position and the full ON position. When the handle is moved to a second position, the handle can be moved to the full ON position.

20 Claims, 3 Drawing Sheets

SINGLE-HANDLE FAUCET

BACKGROUND OF THE INVENTION

This invention relates to a single-handle faucet of the type which can control both the flow rate and the mixing ratio of two different fluids, such as hot and cold water, using only a single handle. More particularly, it relates to a single-handle faucet which is economical to operate.

Single-handle faucets such as water faucets for sinks, bath tubs and showers have become extremely popular because they allow the user of the faucet to control both the flow rate and the temperature of the water discharged from the faucet using one hand. However, it has been found that such faucets are wasteful with respect to water consumption. One reason for this is that the handle of a single-handle faucet is very easy to manipulate, so users have a tendency to move the handle to a position corresponding to maximum flow rate from the faucet. In some faucets, the action of the handle is stiffened in order to make it more difficult for the user to move the handle to its maximum position so as to reduce water consumption. However, the user then tends to exert a large force on the handle to overcome the stiffness, or else the user grasps the handle at its extreme outer end to increase the lever arm, with the result that the handle is again moved to its maximum position, resulting in excessive consumption of water.

In addition, children and other persons having poor motor control sometimes have difficulty adjusting a conventional single-handle faucet to an intermediate position between fully open and fully closed, so they tend to open the faucet more than is necessary. Furthermore, even children who are sufficiently coordinated to operate such a faucet often lack an appreciation of the cost of water, and they move the handle to a position of maximum flow rate.

U.S. Pat. No. 4,708,172 discloses a faucet equipped with a device for restricting the flow of a water through the faucet to an intermediate level which is less than the maximum flow rate. The user can increase the outflow of water from the faucet beyond this intermediate level by raising the handle of the faucet against the action of a resilient tongue. However, that device has the disadvantage that the force required to operate the faucet is increased by the resilient tongue, making flow control difficult and requiring the user to exert a force which may be too great for a child or infirm person. In addition, the flow of water returns to the intermediate level as soon as the user releases the handle, so in order to obtain a continuous, high flow rate, the user must continuously press the handle against the force of the resilient tongue. This operation is not only tiring but occupies one hand of the user, making it impossible for him to wash his hands, for example. Furthermore, when the handle is moved beyond the intermediate level, it is not possible to adjust the mixing ratio of hot and cold water.

SUMMARY OF THE INVENTION

Accordingly, it is an object of the present invention to provide a single-handle faucet which can selectively limit the range of movement of the handle of the faucet to an intermediate position between an OFF position and a full ON position at which the fluid flow rate from the faucet is limited to an economical level.

It is a further object of the present invention to provide a single-handle faucet having a handle which can be easily moved to any desired position beyond the intermediate position.

It is another object of the present invention to provide a single-handle faucet which can perform mixing of two fluids, such as hot and cold water, and control the ratio of the two fluids at any flow rate from the faucet.

It is still another object of the present invention to provide a single-handle faucet which retains its setting when the user releases the handle of the faucet.

It is yet another object of the present invention to provide a single-handle faucet which allows smooth operation of the handle at any setting of the handle.

It is a further object of the present invention to provide an operating handle which can be retrofit on existing single-handle faucets to obtain a faucet which can selectively limit the movement of the handle to an intermediate position.

A single-handle faucet according to the present invention includes a control valve, a connecting rod connected to the control valve, and a handle for moving the connecting rod. A flow limiting means is provided which prevents the handle and connecting rod from being moved beyond an intermediate position and allows the handle and connecting rod to be moved from the OFF position to the full ON position at the option of the user. To disengage the flow limiting means, the handle is mounted for movement relative to the connecting rod between first and second positions.

In preferred embodiments, the flow limiting means includes a motion limiting member which engages a stop when the handle is in a first position to limit flow and which does not engage the stop when in a second position to allow the handle and connecting rod to be moved to the full ON position. In one embodiment the member is movable with the handle axially relative to the connecting rod; in a second embodiment the member is movable axially relative to the connecting rod while the handle is movable transversely relative to the connecting rod. In both embodiments, the member is slidably mounted on the connecting rod. The member includes a projecting portion engaging with a stationary portion of the faucet, such as a rim on the body of the faucet which functions as a stop. By moving the handle between its on and off positions, the member can be moved along the connecting rod between a position in which the projecting portion can engage with the stationary stop portion of the faucet to limit the pivotal movement of the connecting rod, and a position in which the projecting member does not engage the stationary stop portion of the faucet so that the connecting rod can be pivoted to a fully open position.

The intermediate position of the handle and connecting rod can be a position corresponding to an economical flow rate from the valve. When the handle is in its first position, even if the user of the faucet exerts a large force on the handle to pivot the connecting rod, the connecting rod can not move beyond the intermediate position, so the user is prevented from inadvertently producing a large flow rate from the faucet. However, if the user desires a large flow rate, the user can simply move the handle to its second position which over-rides the flow limiting means and then pivot the connecting rod past the intermediate position to any desired position.

DESCRIPTION OF THE PREFERRED EMBODIMENTS

Figures 1, 2, 3, 4, 5:
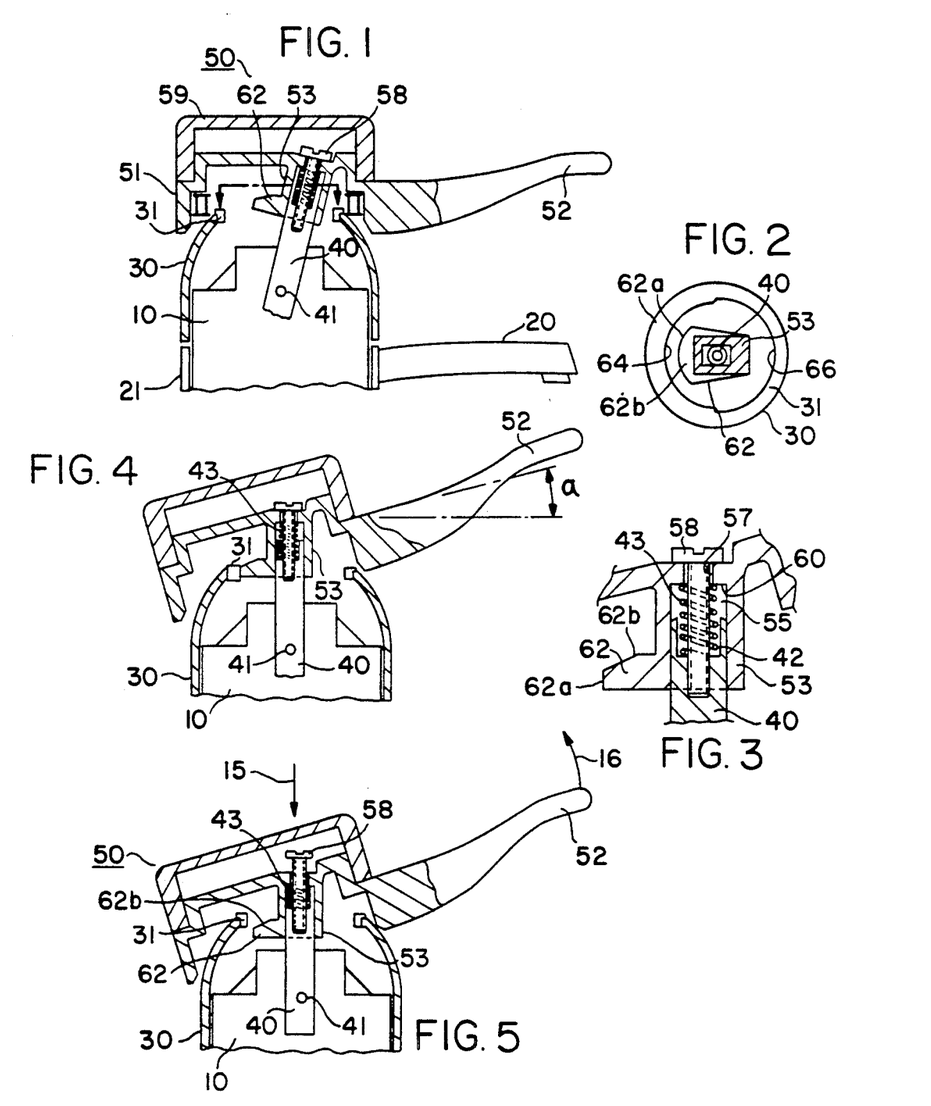
FIG. 1 is a vertical cross-sectional view of a first embodiment of a faucet according to the present invention in an OFF position.
FIG. 2 is a cross-sectional view taken along Line II—II of FIG. 1.
FIG. 3 is an enlarged vertical cross-sectional view of the connection between the handle and the upper end of the connecting rod of the embodiment of FIG. 1.
FIG. 4 is a vertical cross-sectional view of the embodiment of FIG. 1 in a partially open position.
FIG. 5 is a vertical cross-sectional view of the embodiment of FIG. 1 when the handle has been depressed.

A number of preferred embodiments of a single-handle faucet according to the present invention will now be described while referring to the accompanying drawings. FIG. 1 is a vertical cross-sectional view of a first embodiment. It includes a conventional mixing valve 10 that is connected to an unillustrated fluid supply, such as pipes for hot and cold water. A type of single handle faucet and mixing valve that this embodiment may be applied to is shown, for example, in U.S. Pat. No. 4,357,957 which by axial movement of a valve controls flow rate of mixed hot and cold water. Another type of single handle faucet that this embodiment may be applied to is shown in U.S. Pat. No. 4,478,249 which employs a sliding disc type construction to control mixture ratio and flow rate. With the valves of both aforementioned patents raising and lowering pivotal movement of the handle controls flow rate while pivotal movement side to side adjusts mixture ratio.

The valve 10 is also fluidly connected to a spout 20, which is mounted on the outside of the valve 10. The spout 20 may be stationary, or it may be equipped with a member 21 which is rotatably mounted on the valve 10 to enable the spout 20 to be pivoted about a vertical axis to any desired position. The valve 10 is surrounded by a faucet body, which includes a dome 30 covering the top portion of the valve 10 and having an opening in its upper end. The dome 30 may be integral with the spout 20, or as shown in FIG. 1 it can be a separate member so that the spout 20 can be rotated independently of the dome 30. The dome 30 can be made of any suitable material conventionally used for faucet bodies.

As shown in FIG. 2, which is a transverse cross-sectional view taken along Line II—II of FIG. 1, a circumferentially-extending rim 31 is formed along the periphery of the opening in the top of the dome 30. The rim 31 may have a constant radius along its entire periphery, or as shown in FIG. 2, it may be divided into a plurality of sections having different radii.

The operation of the valve 10 is controlled by a handle 50 which is connected to the valve 10 by a connecting rod 40. The upper end of the connecting rod 40 is connected to the handle 50, while the lower end is connected to the valve 10. When the handle is raised or lowered the connecting rod 40 is pivoted about the horizontal axis 41, and the valve 10 is actuated to change the flow rate of water through the spout 20. The valve 10 is also operated to change the mixing ratio of hot to cold water flowing through the spout 20 by side to side or rotational movement of the connecting rod 40. Valves for controlling the flow rate of fluid from a faucet in response to pivotal movement of a handle in two different directions are well-known in the art, and any conventional valve of this type can be used. A few additional examples of suitable valves are those manufactured by Friedrich Grohe under the trade name Europlus (Model 33 060, Model 33065, Model 33 235, etc.) and Ideal Standard valves (Model A 1515, Model A 1516, Model A1519, etc.).

In the embodiment of the invention shown in FIGS. 1—5, the handle 50 includes a knob 51, a sleeve 53 connected to roughly the center of the knob 51, and a lever 52 connected to the periphery of the knob 51. The knob 51, the sleeve 53, and the lever 52 can be made of any durable materials and can be integrally molded as a single member. In accordance with the invention, a motion limiting means is provided by which the movement of the handle is limited to restrict the flow rate, but which may be over-ridden to allow the user to obtain full flow if desired. For this purpose, the sleeve 53, which extends downwards from the underside of the knob 51, has a cavity 55 (FIG. 3) which opens onto the lower end of the sleeve 53 and communicates with the upper surface of the knob 51 through a hole 57. The cavity 55 loosely fits over the upper end of the connecting rod 40 so that the sleeve 53, and thus the entire handle 50, can slide up and down along the connecting rod 40. The knob 51 is prevented from completely separating from the connecting rod 40 by a screw 58 which loosely passes through the hole 57 in the knob 51 and screws into the upper end of the connecting rod 40. The knob 51 is normally resiliently biased upwards along the connecting rod 40 to a raised position in which the upper surface of the knob 51 contacts the head of the screw 58. A biasing member in the form of a helical spring 43 is disposed inside the cavity 55 encircling the screw 58. As shown in FIG. 3, a cavity can be formed in the upper end of the connecting rod 40 to define a seat 42 for the spring 43. Any member having an enlarged head can be used in place of the screw 58 to limit the upwards movement of the knob 51 along the connecting rod 40. However, preferably a detachable member such as a screw is employed so that the knob 51 can be easily disconnected from the connecting rod 40 when it is necessary to repair the valve 10. The upper surface of the knob 51 can be covered by a detachable, protective cap 59. The downwards movement of the sleeve 53 is limited by an end wall 60 of the sleeve 53 which abuts against the upper end of the connecting rod 40 when the handle 50 is pressed downwards.

In carrying out the invention, an outward-extending stop engaging projection 62 for limiting the raising and lowering pivotal movement of the handle 50 about the axis 41 is formed on the lower end of the sleeve 53. As shown in FIG. 2, the projection 62 preferably has a curved outer periphery with a radius of curvature which is less than or equal to that of the rim 31 so that the connecting rod 40 can be pivoted about its longitudinal axis when the projection 62 contacts the rim 31. The projection 62 has a first surface 62a for abutment against the rim 31 and a second surface 62b which adjoins and is sloped with respect to the first surface 62a.

FIG. 1 shows the faucet in an OFF position in which there is no flow of water from the spout 20 and the handle 50 is in an axially raised position relative to the connecting rod 40. If a user wishes to turn on the faucet, he pivots the connecting rod 40 by means of the lever 52 of the handle 50 in the counterclockwise direction in FIG. 1 about the axis 41, and water begins to flow from the faucet. When the connecting rod 40 and the lever 52 are pivoted by an angle o from the OFF position to an intermediate position shown in FIG. 4, the projection 62 abuts against the rim 31 of the dome 30 and prevents further pivotal movement of the handle 50. The angle o, which is determined by the dimensions of the projection 62, is chosen so that the flow rate of water from the spout 20 at this angle will be sufficient for typical uses requiring only a small flow rate, such as washing ones hands, shaving, or filling a glass of water. There is no restriction on the value of angle $\alpha$, and any suitable value can be employed. For example, it can be the angle at which the flow rate is approximately ½ the maximum flow rate for the faucet.

When the connecting rod 40 and the handle 50 are in the intermediate position of FIG. 4, the curved shape of the first surface 62a of the projection 62 allows the projection 62 to freely slide with respect to the rim 31 of the dome 30. Therefore, the user can adjust the mixture of hot and cold water by pivoting the lever 52 about the longitudinal axis of the connecting rod 40 while maintaining a constant flow rate.

If the user desires a higher flow rate than is permitted at the intermediate position of the handle 50, the user presses downwards on the cap 59 in the direction of arrow 15 in FIG. 5. The downwards force on the cap 59 causes the entire handle 50 to slide downwards axially along the connecting rod 40. At some point when or before the upper end of the connecting rod 40 contacts the end wall 60 of the cavity 55 in the sleeve 53, the first surface 62a of the projection 62 clears the lower edge of the rim 31. While pressing downwards on the cap 59, if the user pivots the handle 50 slightly counterclockwise in FIG. 5 as shown by arrow 16, the second surface 62b of the projection 62 will engage with the lower edge of the rim 31, thereby preventing the handle 50 from returning to its raised position when the user releases from the cap 59. The operation of pressing the cap 59 downwards and rotating the handle 50 slightly counterclockwise can be easily performed using a single hand.

Figure 6:
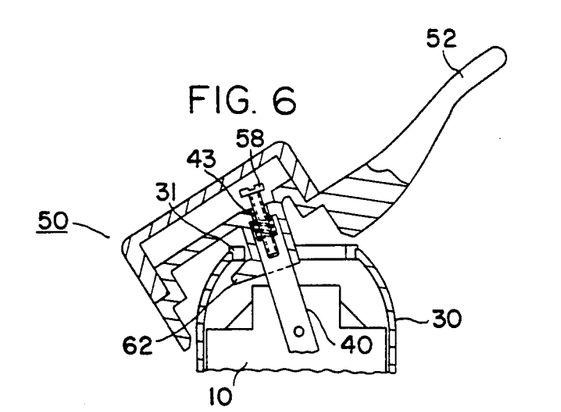
FIG. 6 is a vertical cross-sectional view of the embodiment of FIG. 1 in a fully open position.

Once the second surface 62b of the projection 62 engages with the rim 31, the handle 50 can be pivoted counterclockwise about the axis 41 to any position between the intermediate position of FIG. 4 and a fully open position shown in FIG. 6, so the user can set the flow rate of water at any desired value. The sloping second surface 62b of the projection 62 can freely slide with respect to the rim 31 of the dome 30, so the handle 50 can be easily pivoted about the axes 41. Furthermore, the handle 50 can be freely rotated about the longitudinal axis of the connecting rod 40 to permit adjustment of the mixture of hot and cold water at all times.

The flow rate of water can be decreased by rotating the handle 50 in the clockwise direction from the position shown in FIG. 6. When the handle 50 reaches the intermediate position of FIG. 4, the first surface 62a of the projection 62 will clear the lower edge of the rim 31, and the biasing force of the spring 43 will cause the handle 50 to slide upwards along the connecting rod 40 to a raised position. Therefore, whenever the faucet is shut off, the projection 62 is automatically restored to a position in which it can limit the rotation of the connecting rod 40.

As shown in FIG. 2, in this embodiment, the rim 31 of the dome 30 has two different sections 64 and 66 having different radii in order to enable a user to adjust the value of the angle $\alpha$ at which the projection 62 abuts the rim 31 in accordance with the usual pressure of the water supply to which the faucet is connected. The dome 30 can be mounted on the valve 10 so that either of the two sections of the rim 31 opposes the projection 62. The rim 31 has a first section 64 with a first radius and a second section 66 with a second radius which is larger than the first radius. When the faucet is installed in a building having a typical water pressure, the dome 30 is mounted on the valve 10 so that the first section 64 opposes the projection 62 on the sleeve 53. When the faucet is installed in a building having a low water pressure, the dome 30 is mounted on the valve 10 so that the second section 66 opposes the projection 62 of the sleeve 53. Since the second section 66 has a larger radius than the first section 64, the angle $\alpha$ of the handle 50 when the projection 62 contacts the second section 66 of the rim 31 will be greater than it would be when contacting the first section 64 of the rim 31, thereby compensating for the lower water pressure to obtain a suitable flow rate of water. Although the rim 31 of FIG. 2 is divided into only two sections 64 and 66, in a typical valve, the maximum rotation of the connecting rod 40 about its axis is generally constrained to significantly less than 180 degrees, so it may be possible to divide the rim 31 into three or more sections having different radii.

In the embodiment of FIG. 1, since the projection 62 on the sleeve 53 has fixed dimensions, the value of the angle $\alpha$ at which the projection 62 abuts against the rim 31 is constant for a given rim. However, it is possible for the projection 62 to include an adjustable member to vary the amount by which the projection 62 protrudes from the sleeve 53. Such an adjustable member can be in the form of a screw which screws into the projection 62 and has a head which abuts against the rim 31 when the handle 50 is rotated counterclockwise in the figures. By screwing the screw into or out of the sleeve 53, the distance of the head of the screw from the sleeve 53 can be varied to adjust the value of the angle $\alpha$.

Figure 7:
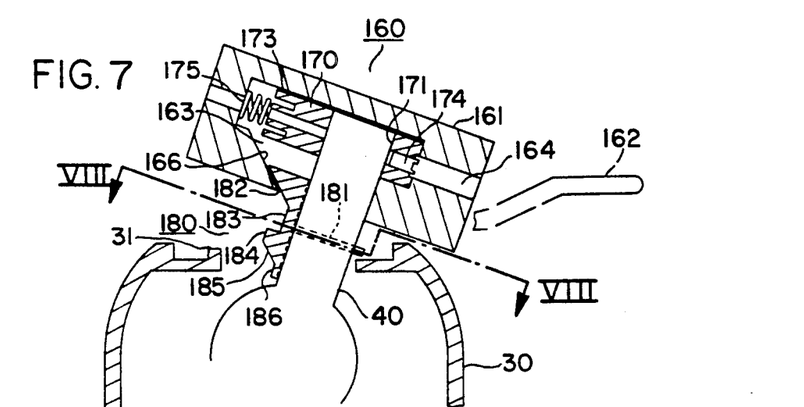
FIG. 7 is a vertical cross-sectional view of another embodiment of the present invention in an OFF position.

FIGS. 7 through 11 are cross-sectional views of another embodiment of the present invention. FIG. 7 is a vertical cross-sectional view of this embodiment in an OFF position. Like the embodiment of FIG. 1, it includes an unillustrated valve surrounded by a dome 30 and operated by the movement of a pivotable connecting rod 40. This embodiment may be utilized with a valve of the ball valve type disclosed in U.S. Pat. No. 3,422,849, for example, wherein a ball valve member is received in a spherical socket, and the connecting rod 40 is pivotable by raising and lowering a handle 160 to vary rate of water flow and by movement of the handle 160 from side to side to vary the mixture of hot and cold. The handle 160 includes a knob 161 and may include a lever 162 which is secured to the periphery of the knob 161 such that, by raising and lowering the handle 160 between the OFF position of FIG. 7 and the full ON position of FIG. 11, the rate of water may be controlled.

Figure 9:
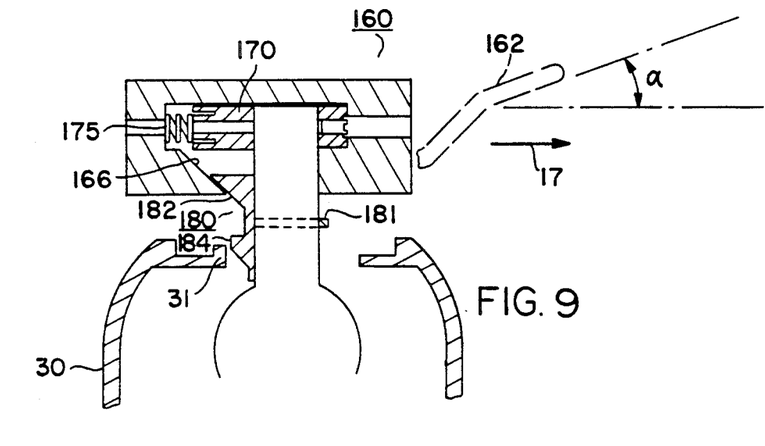
FIG. 9 is a vertical cross-sectional view of the embodiment of FIG. 7 in a partially open position.
Figure 10:
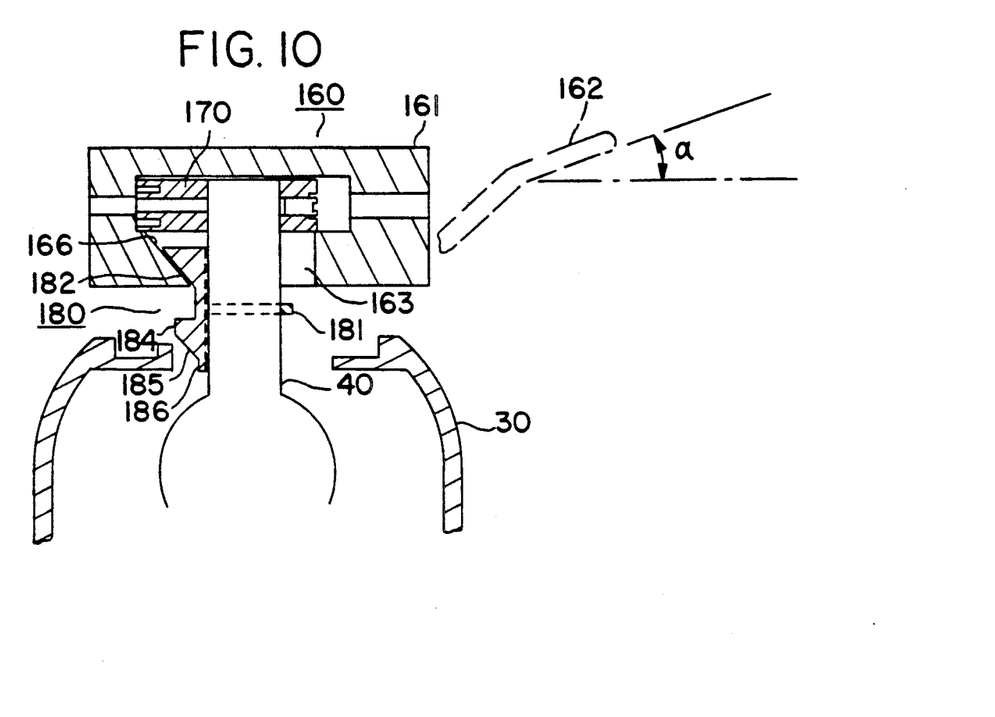
FIG. 10 is a vertical cross-sectional view of the embodiment of FIG. 7 when the handle is pulled forwards by a user from the position shown in FIG. 9.
Figure 11:
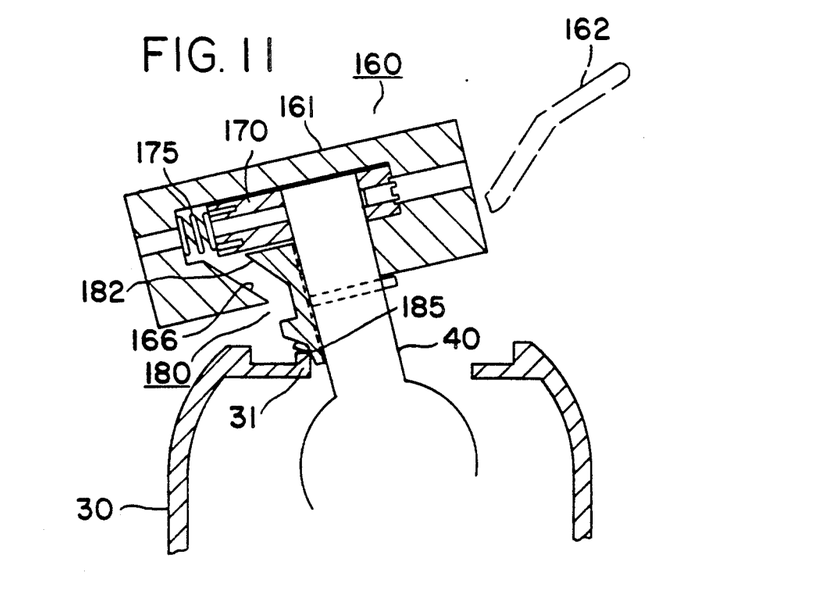
FIG. 11 is a vertical cross-sectional view of the embodiment of FIG. 7 in a full ON or open position.

In accordance with the invention, motion limiting means is provided for preventing the handle from moving to its full ON position and allowing the motion limiting means to be disengaged so that the user can obtain full flow if desired. To this end, the knob 161 is mounted for relative movement on the rod 40 between a left-hand or backward position as shown in FIGS. 7 and 9 to a right-hand or forward position as shown in FIGS. 10 and 11. Furthermore, the knob 161 is formed with a cavity 163 in which a collar 170 is received which fits over the upper end of the connecting rod 40. The collar 170 is secured to the connecting rod 40 by any suitable means, such as by a set screw 174. The collar 170 is slidably disposed within the cavity 163 formed inside the knob 161 so that the knob 161 of the handle 160 can move transversely with respect to the connecting rod 40 between the forward position (FIGS. 7, 9) and the back position (FIG. 10). If the collar 170 is secured to the connecting rod 40 by a set screw 174, an access hole 164 for the set screw 174 can be formed in the knob 161 between the knob cavity 163 and the periphery of the knob 161. A helical biasing spring 175 is disposed between the collar 170 and the inner surface of the cavity 163. The spring 175 presses the left end of the cavity 163 away from the left end of the collar 170 in FIG. 7, so that normally the right end of the cavity 163 is pressed against the right end of the collar 170 and the knob 161 is resiliently biased to the backward position. A spring seat 173 can be formed in the end of the collar 170 to receive one end of the spring 175. The lower portion of the knob cavity 163 opens onto the lower surface of the knob 161 and includes a sloping cam surface 166 which opposes the connecting rod 40. In addition to the collar 170, in the cavity 163 formed within the knob 161 there is slidably mounted for vertical movement a motion limiting member 180 which in the forward position of the knob 161 slides to a lowered position as shown in FIG. 7 and 9 wherein it engages a stop provided by the inner circumferential edge of the rim 31 of the faucet dome or housing 31. The motion limiting member 180 includes a ring 181 which fits loosely around the connecting rod 40 and enables the member 180 to slide in the axial direction of the connecting rod 40.

Figure 8:
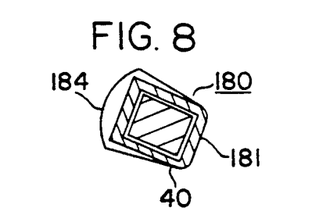
FIG. 8 is a transverse cross-sectional view taken along Line VIII—VIII of FIG. 7.

Further in keeping with the invention, the member 180 may be bodily lifted to the position shown in FIG. 10 so as to clear the rim 31 and allow the handle 160 to be pivoted to the full ON position by a camming action produced by transverse movement of the handle 160 from the backward to the forward position. For this purpose, the member 180 has a first cam surface 182 which extends away from the connecting rod 40 with a slope which matches that of the cam surface 166 of the knob cavity 163. The member 180 is lifted by the knob 161 by means of the first cam surface 182 of the member 180 and the cam surface 166 of the knob 161 so that when the knob 161 is moved transversely with respect to the connecting rod 40, the member 180 is moved axially along the connecting rod 40 and thereby lifted relative to the rim 31. A first flat section 183 adjoins the base of the first cam surface 182, and a projection 184 which extends away from the connecting rod 40 adjoins the lower end of the first flat section 183. The outer periphery of the projection 184 is vertical as viewed in elevation. However, as shown in FIG. 8, which is a cross-sectional view taken along Line VIII—VIII of FIG. 7, the periphery of the projection 184 is preferably curved as viewed in plan. The curved plan shape of the projection 184 allows the projection 184 to move laterally with respect to the rim 31, so that the connecting rod 40 can be shifted from side to side or rotated about its longitudinal axis depending on the construction of the control valve when the projection 184 contacts the rim 31 of the dome 30. A sloping second cam surface 185 adjoins the lower end of the projection 184, and a second flat section 186 adjoins the lower end of the second cam surface 185. The member 180 can be conveniently formed as an integral member by molding, for example. In order to enable the second cam surface 185 and the second flat section 186 to slide freely with respect to the rim 31, these portions of the member 180 may be formed with a curved periphery as viewed in plan.

The embodiment of FIG. 7 can be assembled by first mounting the helical spring 175 on the spring seat 173 of the collar 170, and then inserting the collar 170 and spring 175 into the upper portion of the knob cavity 163. The first cam surface 182 of the member 180 can then be inserted into the lower portion of the knob cavity 163, and the member 180 and the knob 161 can then be lowered onto the upper end of the connecting rod 40 so that the connecting rod 40 slips through the ring 181 of the member 180 and into the hole 171 in the collar 170. The collar 170 can then be secured to the connecting rod 40 by the set screw 174 which is inserted through the access hole 164.

When a user wishes to turn on the faucet, he raises the handle 160 from the OFF position in FIG. 7, and water begins to flow from the faucet. When the handle 160 is pivoted by an angle c with respect to the OFF position to the intermediate position shown in FIG. 9, the projection 184 of the member 180 abuts the stop provided by the rim 31 of the dome 30 and prevents the further movement of the connecting rod 40 in the direction to increase water flow. As in the previous embodiment, the dimensions of the projection 184 are chosen so that at an angle a, the flow rate of water from the spout 20 under normal conditions will be sufficient for typical uses requiring only a small flow rate.

When the handle 160 is in the intermediate position shown in FIG. 9, the curved shape of the projection 184 allows the projection 184 to freely slide with respect to the rim 31 of the dome 30. Therefore, the user can adjust the mixture of hot and cold water by shifting the handle 160 either about the longitudinal axis of the connecting rod 40 or laterally from side to side while maintaining a constant flow rate.

If the user desires a higher flow rate than is permitted at the intermediate position of the handle 160, the user pulls the handle 160 forward towards the user, i.e., to the right in FIG. 9 as shown by arrow 17. The pulling force causes the knob 161 of the handle 160 to slide transversely with respect to the upper end of the connecting rod 40 so that the knob 161 moves to the right in FIG. 9. As the knob 16 moves to the right, the cam surface 166 of the knob cavity 163 exerts a force on the first cam surface 182 of the member 180, and this force causes the member 180 to slide upwards along the connecting rod 40. At some point when or before the left end of the knob cavity 163 contacts the left end of the collar 170, the projection 184 of the member 180 clears the rim 31 of the dome 30, as shown in FIG. 10. At this time, since the projection 184 no longer abuts the rim 31, the user can pivot the handle 160 in the counterclockwise direction beyond the intermediate position of FIG. 9 to increase the flow of water from the spout 20. Once the projection 184 of the member 180 is clear of the rim 31, the handle 160 can be adjusted to any position between the intermediate position shown in FIG. 9 and a full ON position shown in FIG. 11. Furthermore, as soon as the connecting rod 40 has been pivoted clockwise slightly past the intermediate position, the user no longer needs to pull the handle 160. When the user stops pulling the handle 160 towards the user, the spring 175 pushes the knob 161 of the handle 160 to the left in the figures, and a gap will be formed between the cam surface 166 of the knob 160 and the first cam surface 182 of the member 180. Therefore, the member 180 will slide down the connecting rod 40 under the force of gravity until the second cam surface 185 of the member 180 contacts the rim 31 of the dome 30. If the handle 160 is pivoted counterclockwise from the position shown in FIG. 10, the rim 31 exerts a camming force on the second cam surface 185 of the member 180, causing the member 180 to slide smoothly upwards along the connecting rod 40.

At any position of the handle 160 between the intermediate position of FIG. 9 and the full ON or open position of FIG. 11, the user can pivot the connecting rod 40 to adjust the mixture of cold and hot water. The curved peripheral surfaces of the projection 184, the second cam surface 185, and the second flat section 186 as viewed in plan ensure that the member 180 can slide freely along the rim 31 to permit smooth operation. Furthermore, the user can release the handle 160 and the connecting rod 40 will retain its angular position.

When the user pivots the handle 160 back in the clockwise direction past the intermediate position of FIG. 9, the member 180 will slide downwards along the connecting rod 40 until the first cam surface 182 of the member 180 contacts the cam surface 166 of the knob 161. In this position, the projection 184 of the member 180 will abut against the rim 31 if the connecting rod 40 is again pivoted in the counterclockwise direction to limit the flow rate of water from the faucet.

As in the embodiment of FIG. 1, the rim 31 of the dome 30 may have a plurality of sections having different radii so that the user can adjust the value of the angle α in accordance with the water pressure in the building in which the faucet is installed.

It can be seen that a single-handle faucet according to the present invention automatically limits the movement of a connecting rod for a valve to an intermediate position between an OFF position and a full ON position. The intermediate position of the connecting rod can be set so as to correspond to an economical flow rate from the valve, so that even when a user of the faucet inadvertently exerts a large force on the handle of the faucet, the flow rate from the faucet can be restricted to a low level. If the user desires to increase the flow rate to a higher level, he can do so by a simple manipulation of the handle without having to apply a large or continuous force. Furthermore, the user can adjust the mixture of fluids flowing from the faucet, such as the mixture of hot and cold water, regardless of the flow rate from the faucet. A faucet according to the present invention is especially suitable for use by children, who lack the coordination to set a single-handle faucet to a suitable, economical setting.

A conventional single-handle faucet can be easily converted into a single-handle faucet according to the present invention by simply replacing the handle and possibly the dome of the conventional faucet with a handle and dome like those shown in the figures.

In the preceding embodiments, a single handle-faucet according to the present invention is in the form of a faucet for multiple fluids, such as a faucet for mixing hot and cold water. However, the present invention can also be a single-handle faucet for dispensing a single fluid.

What is claimed is:

1. A single lever faucet comprising:
   a control valve;
   a movable connecting rod which operates said control valve;
   a handle extending from said connecting rod to move said rod, said handle being movable in a first direction of movement between an OFF position and a full ON position to control said control valve to vary flow rate of fluid from the faucet, said handle being movable in a different second direction of movement between a cold position and a hot position to control said control valve to vary temperature of fluid from the faucet,; and
   a movable limiting member which prevents said handle from being moved in the first direction of movement beyond an intermediate position between the OFF position and the full ON position when said member engages a stop, thereby to limit flow rate from the faucet; and
   user operated means for moving said member to a position where it clears the stop thereby overriding the flow rate limit when said handle is moved in the first direction of movement beyond the intermediate, said user operated means being moved by a manual push from a user to move said member and override the flow rate limit when the handle is at and position in the second direction of movement between the cold position and the hot position.

2. A faucet as claimed in claim 1 wherein said handle is mounted on said connecting rod for movement axially of said connecting rod for disengaging said motion limiting member.

3. A faucet as claimed in claim 1 wherein said handle is mounted on said connecting rod for movement transversely with respect to said connecting rod for disengaging said member.

4. A faucet comprising:
   a control valve;
   a movable connecting rod which operates said control valve;
   a handle extending from said connecting which is movable between an OFF position and a full ON position to control flow rate of fluid through said control valve.
   a motion limiting member which prevents said handle from being moved beyond an intermediate position between the OFF position and the full ON position when said member is engaged; and
   user operated means for disengaging said member which allows said handle to be moved to the full ON position,
   said faucet including a faucet housing having an opening surrounding said connecting rod, and
   a stop formed on said faucet housing adjacent said connecting rod,
   said handle being movable relative to said connecting rod between first and second positions;
   said motion limiting member being slidably mounted on said connecting rod and coupled with said handle for movement axially of said connecting rod between a first position and a second position when said handle is moved between its first and second positions; and said motion limiting member having an engaging portion which engages said stop on said faucet housing upon movement of said motion limiting member when said member is in its first position and defines a position of said handle intermediate its OFF and full ON positions, and which does not engage said stop when said motion limiting member is in its second position and allows said handle to pass the intermediate position and move to its full ON position, said motion limiting member being slidably moved on said connecting rod by a manual downward push of a user to clear said member from said stop so that the handle can be moved to its full ON position.

5. A faucet as claimed in claim 4 wherein said motion limiting member is secured to said handle, said handle being movable axially relative to said connecting rod.

6. A faucet as claimed in claim 5 further comprising a resilient biasing member disposed between said handle and said connecting rod for biasing the handle to its first position.

7. A faucet as claimed in claim 4 wherein:

said connecting rod has a longitudinal axis and said handle is slidably mounted on said connecting rod for movement transversely with respect to the axis of the connecting rod and includes a cam surface; and said motion limiting member includes a cam surface for engaging with the cam surface of said handle such that said motion limiting member is moved along the axis of said connecting rod when said handle is moved transversely with respect to said connecting rod.

8. A faucet as claimed in claim 4 wherein the engaging portion or said motion limiting member and said rim have contacting surfaces which can slide with respect to one another when contacting one another.

9. A single lever faucet comprising:

a control valve;

a pivotally mounted connecting rod connected to move the control valve, said connecting rod being pivotally movable in a first direction of movement between an OFF position and a full ON position to control said control valve to vary the flow rate of fluid from the faucet, said connecting rod being movable in a different second direction of movement between a cold position and a hot position to control said control valve to vary temperature of fluid from the faucet;

a stop disposed to be engaged by said connecting rod upon pivotal movement thereof; and a motion limiting member slidably mounted on said connecting rod, said member being movable between a first position in which it contacts said stop to prevent said connecting from being pivoted beyond an intermediate position between the OFF position and the full ON position to limit flow from the faucet, and a second position in which said member clears said stop and the connecting rod can be pivoted to the full ON position when slidably moved manually by a user to the second position to allow full flow from the faucet.

10. A faucet as claimed in claim 9 further comprising a dome-shaped member having an opening with a rim which surrounds said connecting rod, wherein the stop comprises the rim of the opening.

11. A faucet as claimed in claim 10 wherein the rim of said dome-shape member has a plurality of sections having different radii and said dome-shaped member can be mounted on the faucet so that any one of the sections of said rim can be engaged by said motion limiting member upon pivotal movement of said connecting rod.

12. A faucet as claimed in claim 9 further comprising a handle which is mounted on said connecting rod and is movable with respect to said connecting rod between a first position and a second position, said handle being coupled to move said motion limiting member between its first and second positions as said handle is moved between its first and second positions.

13. A faucet as claimed in claim 12 wherein said motion limiting member is secured to said handle, and said handle is slidably mounted on said connecting rod for movement axially of said connecting rod.

14. A faucet as claimed in claim 13 further comprising a biasing member disposed between said connecting rod and said handle for biasing said handle to its first position.

15. A faucet as claimed in claim 14 wherein said biasing member comprises a spring.

16. A faucet as claimed in claim 12 wherein:

said handle is slidably mounted on said connecting rod for movement transversely with respect to the axis of said connecting rod and includes a cam surface; and said motion limiting member includes a sleeve having a cam surface which engages with the cam surface of said handle such that said motion limiting member is moved axially along said connecting rod between its first and second positions when said handle is moved transversely with respect to said connecting rod between its first and second positions.

17. A faucet comprising:

a control valve;

a connecting rod connected to said control valve;

a handle on said connecting rod mounted for pivotal movement in two different directions, said handle being pivotally moved in a first of said directions between an OFF position and a full ON position to control the flow rate of a fluid through said control valve; and flow limiting means including a movable motion limiting member having a first position in which it engages a stop preventing said handle from being pivotally moved past a partially open position between the OFF position and the full ON position, said motion-limiting member allowing said handle to be pivotally moved past the partially open position to override the flow rate limit when moved by a manual push by a user from the first position to a second position in which it clears the stop, said motion limiting member being moved manually at any position of said handle in a second of said directions of movement.

18. A faucet as claimed in claim 17 wherein said flow limiting means comprises a sleeve secured to said handle and slidably mounted on said connecting rod for movement axially of said connecting rod between a first position and a second position, said sleeve having a projecting portion, and a stationary stop disposed opposite the projecting portion, the projecting portion contacting said stop when said handle has moved pivotally by an angle α from the OFF position when the sleeve is in its first position.

19. A faucet as claimed in claim 18 wherein the angle α corresponds to a flow rate from the faucet approximately one half of the flow rate when said handle is in its full ON position.

20. A faucet as claimed in claim 18 wherein said sleeve is movable bodily with said handle on said connecting rod between a first position and a second position, as said handle is moved between its first and second positions.

* * * * *

UNITED STATES PATENT AND TRADEMARK OFFICE
CERTIFICATE OF CORRECTION

PATENT NO. : 5,082,023

DATED : January 21, 1992

INVENTOR(S) : Stephane D'Alayer

It is certified that error appears in the above-identified patent and that said Letters Patent is hereby corrected as shown below:

On the title page:

Item No. [56], References Cited, the following patent was omitted: --4,805,245  2/1989  Herring--.

Claim 1, Column 10, line 36, change "and" to --any--.

Claim 4, Column 10, line 53, change "." to --;--.

Signed and Sealed this

Eleventh Day of May, 1993

Attest:

MICHAEL K. KIRK

*Attesting Officer*        Acting Commissioner of Patents and Trademarks